(12) United States Patent
Canpolat et al.

(10) Patent No.: US 9,125,143 B2
(45) Date of Patent: Sep. 1, 2015

(54) BROADCAST BASED DISCOVERY OF WI-FI NETWORKS, DEVICES AND SERVICES

(71) Applicants: Necati Canpolat, Beaverton, OR (US); Vivek G. Gupta, San Jose, CA (US)

(72) Inventors: Necati Canpolat, Beaverton, OR (US); Vivek G. Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 13/728,657

(22) Filed: Dec. 27, 2012

(65) Prior Publication Data

US 2014/0185598 A1 Jul. 3, 2014

(51) Int. Cl.
*H04H 20/71* (2008.01)
*H04W 4/00* (2009.01)
*H04W 48/16* (2009.01)

(52) U.S. Cl.
CPC .............. *H04W 48/16* (2013.01); *Y02B 60/50* (2013.01)

(58) Field of Classification Search
USPC .......... 370/254–338, 395–432; 455/434–556, 455/401–411; 709/220–227
See application file for complete search history.

(56) References Cited

U.S. PATENT DOCUMENTS

| | | | |
|---|---|---|---|
| 8,391,828 B2* | 3/2013 | Kim et al. ................... | 455/404.1 |
| 8,520,583 B2* | 8/2013 | Kasslin et al. ................ | 370/312 |
| 8,559,350 B2* | 10/2013 | Kuehnel et al. .............. | 370/312 |
| 2007/0141988 A1 | 6/2007 | Kuehnel et al. | |
| 2008/0151796 A1* | 6/2008 | Jokela ........................... | 370/310 |
| 2009/0010399 A1 | 1/2009 | Kim et al. | |
| 2009/0274094 A1 | 11/2009 | Engwer | |
| 2012/0243524 A1 | 9/2012 | Verma et al. | |
| 2012/0281609 A1 | 11/2012 | Kasslin et al. | |
| 2013/0109314 A1* | 5/2013 | Kneckt et al. ................ | 455/41.2 |
| 2013/0121325 A1* | 5/2013 | Mccann et al. ............... | 370/338 |
| 2013/0281056 A1* | 10/2013 | Abraham et al. ............. | 455/411 |
| 2013/0301607 A1* | 11/2013 | McCann et al. .............. | 370/331 |
| 2013/0304918 A1* | 11/2013 | Kneckt ......................... | 709/225 |
| 2014/0092779 A1* | 4/2014 | Seok et al. .................... | 370/254 |
| 2014/0119353 A1* | 5/2014 | McCann et al. .............. | 370/338 |

FOREIGN PATENT DOCUMENTS

WO WO-2014105117 A1 7/2014

OTHER PUBLICATIONS

"Chapter 8: 802.11 PHY Layers: CWAP Exam Objectives", [online]. Retrieved from the Internet: <URL: http://media.techtarget.com/searchMobileComputing/downloads/CWAP_ch8.pdf>, (Accessed Oct. 11, 2012), 213-239.

(Continued)

*Primary Examiner* — Man Phan
(74) *Attorney, Agent, or Firm* — Schwegman Lundberg & Woessner, P.A.

(57) ABSTRACT

Embodiments reduce the time and energy expended to establish an initial link to a network. Some embodiments use either active or passive scans to discover available access points and then use a broadcast or multicast Generic Advertisement Service (GAS) Request message to identify access points providing requested services. Other embodiments use a broadcast or multicast GAS Request message to identify access points or mobile devices providing requested services without first scanning for access points. Only access points or mobile devices providing requested services need to respond to the GAS request message. Duplicate messages received by multiple access points coupled to the same network can be filtered so only one message is received and responded to.

13 Claims, 7 Drawing Sheets

(56) References Cited

OTHER PUBLICATIONS

"Hotspot 2.0 (Release 1) Technical Specification: Version 1.0.0", Wi-Fi Alliance Technical Committee Hotspot 2.0 Technical Task Group, (2012), 25 pgs.

"International Application Serial No. PCT/US2013/044431, International Search Report mailed Aug. 27, 2013", 4 pgs.

"International Application Serial No. PCT/US2013/044431, Written Opinion mailed Aug. 27, 2013", 8 pgs.

"Part 11: Wireless LAN Medium Access Control (MAC) and Physical Layer (PHY) Specifications: Amendment 9: Interworking with External Networks", IEEE Standards Association, IEEE Computer Society, Std 802.11u-2011, Local and Metropolitan Area Networks, (Feb. 25, 2011), 208 pgs.

"The Future of Hotspots: Making Wi-Fi as Secure and Easy to Use as Cellular", Cisco, White Paper, (2012), 9 pgs.

Klein, Philippe, "802.11 QoS Overview", IEEE Plenary Meeting, (Nov. 2008), 38 pgs.

Konsgen, Andreas, et al., "Chapter 3: Overview 802 Standard and Chapter 4: Wireless LANs IEEE 802.11", Universitat Bremen—Summer Term, (2011), 40 pgs.

"International Application Serial No. PCT/US2013/044431, International Preliminary Report on Patentability mailed Jul. 9, 2015", 10 pgs.

\* cited by examiner

| ORDER | INFORMATION |
|---|---|
| 0 | PUBLIC ACTION FRAME |
| 1 | GAS INITIAL REQUEST FRAME |
| 2 | DELIVERY METHOD (UNICAST, MULTICAST, BROADCAST) |
| 3 | DIALOG TOKEN |
| 4 | ADVERTISEMENT PROTOCOL ELEMENTS |
| 5 | QUERY REQUEST LENGTH |
| 6 | QUERY REQUEST |

Fig. 4

BROADCAST BASED DISCOVERY OF WI-FI NETWORKS, DEVICES AND SERVICES

TECHNICAL FIELD

Embodiments pertain to wireless communications. More particularly, embodiments pertain to establishing an initial connection to a network.

BACKGROUND

An ongoing problem in devices is the time and power required to establish a connection to a network. In particular, it can be time and energy consuming to scan for access points or other responders, identify the proper responder, and establish a connection thereto.

BRIEF DESCRIPTION OF THE DRAWINGS

FIG. 4 illustrates a Generic Advertisement Service (GAS) message, according to some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The IEEE 802.11u standard (IEEE Std 802.11u-2011) has defined GAS and Access Network Query Protocol (ANQP), which are used by the Wi-Fi Alliance (WFA) Hotspot 2.0 program and WFA Wi-Fi Direct (Wi-Fi Peer-to-Peer) program, which allow a Station (STA) to discover and establish a link to a responder (such as an Access Point (AP), STA, or other responder). The defined standard is based on query-response mechanism—a device sends a query request to the Wi-Fi Access network (or another device as in the case of Wi-Fi Direct) and the network or responding device comes back with a response. All of these request and responses are "unicast" based messages. In other words, if a mobile device identifies 50 different Wi-Fi networks or Wi-Fi enabled peer devices (STAs) in a given location, it will have to send the query request to all networks and devices one-by-one 50 times and get responses from them individually. This process is illustrated in FIG. 1.

Figure 1:
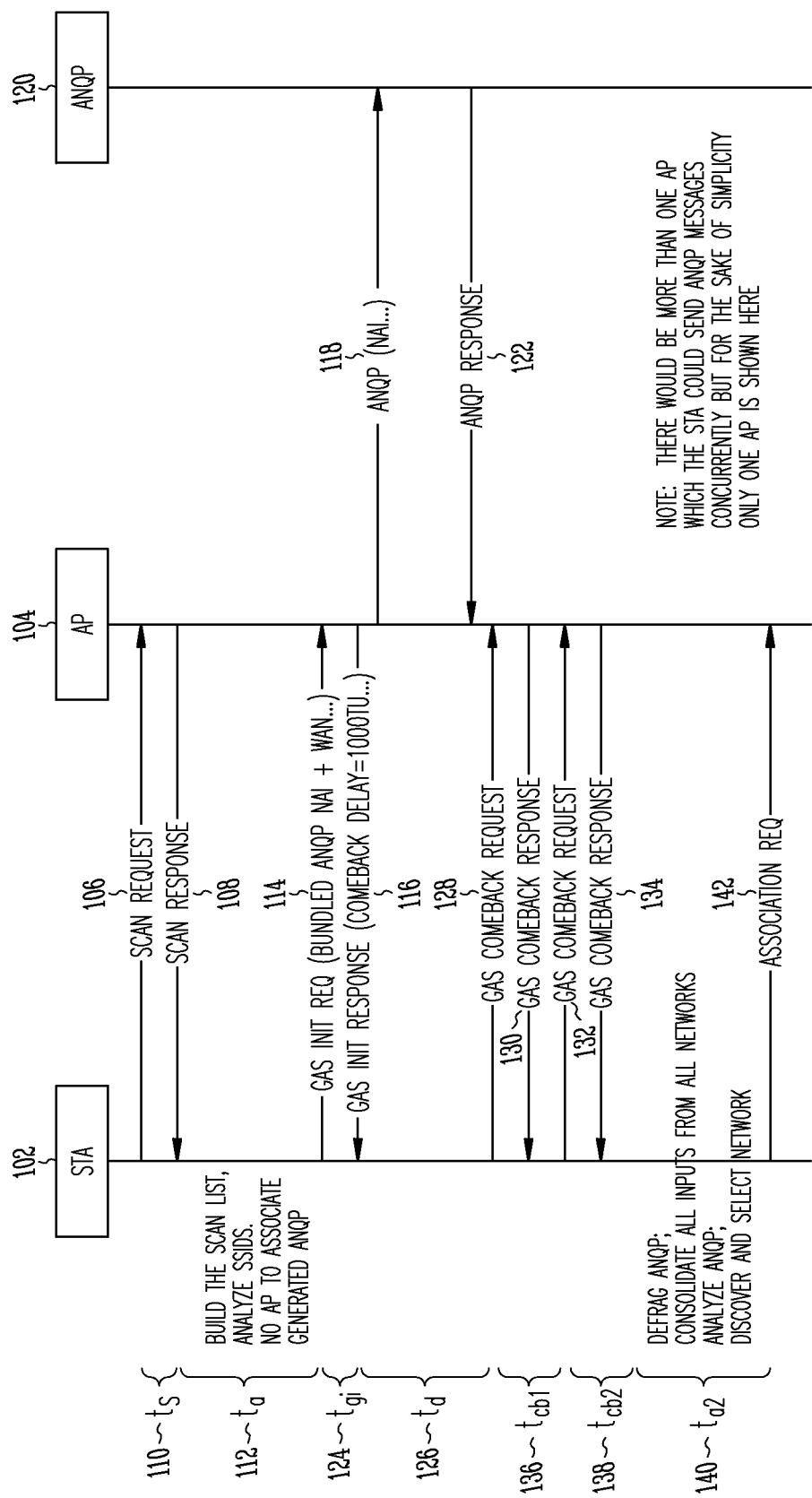
FIG. 1 illustrates the procedure for an initial link establishment, according to existing protocols.

In FIG. 1, as a device, such as STA 102, comes in radio range of one or more hotspots, provided by a responder such as a AP 104, a STA (not illustrated), or other responder (not illustrated), it performs a process to discover the Wi-Fi network name (e.g. Service Set Identifier (SSID)) of the available hotspots. This can be a passive scan process (not illustrated) or an active scan process, as illustrated as part of FIG. 1.

In FIG. 1, as part of the active scan process, STA 102 transmits a scan request 106 to a selected access point, such as AP 104. The selected access point, such as AP 104, responds with scan request response 108. The process is repeated for each available responder. FIG. 1 illustrates the time to scan each responder as $t_s$ 110. After STA 102 builds the scan list of all available responders, it analyzes the list to discover if it "knows" any of the responders (e.g., associated with the wireless network, or has a stored profile of the wireless network). This is illustrated in FIG. 1 as $t_a$ 112. The scan time ($t_s$ 110) and analysis time ($t_a$ 112) can each be about several hundred milliseconds.

Assuming STA 102 does not recognize any of the responders, it can use GAS to post an ANQP query to each of the responders to discover whether any are able to provide access to a desired service, for example. In FIG. 1, this is illustrated by GAS Init Request 114 sent to AP 104. AP 104 responds with GAS Init Response 116, which lets STA 102 know how long to wait until STA 102 requests the information that AP 104 will receive from ANQP server 120 (illustrated as GAS comeback delay $t_d$ 126 in FIG. 1). AP 104 sends ANQP message 118 to ANQP server 120 and receives ANQP response 122 from ANQP server 120. The round trip time delay for AP 104 to receive GAS Init Req 114 and send GAS Init Response 116 (illustrated as $t_{gi}$ 124 in FIG. 1) can be about 100 ms or so. GAS comeback delay $t_d$ 126 can be about a second or more.

After the appropriate GAS comeback delay ($t_d$ 126), STA 102 sends GAS comeback request 128, receives GAS comeback response 130, and perhaps engages in additional GAS comeback request/response exchanges (e.g., GAS comeback request 132 and GAS comeback response 134) in order to receive all of the information provided by ANQP server 120. The time delay for a GAS comeback request/response can be about 100 ms and is illustrated in FIG. 1 as $t_{cb1}$ 136 and $t_{cb2}$ 138.

Note that this process needs to be completed for each responder (e.g., AP or STA) that STA 102 discovered.

Assuming the ANQP information was fragmented across multiple GAS comeback request/response exchanges, STA 102 needs to defragment the ANQP information for each responder, consolidate all information from all the networks, analyze the ANQP information, and select a network that can provide the service that STA 104 desires. This time is illustrated in FIG. 1 as $t_{a2}$.

After a desired responder is selected, STA 102 sends an Association Request message 142.

Using the existing protocol, it can take significant time and energy to discover and identify all responders, identify the services provided by the responders, select an appropriate responder, and send an association request message. This is true even if the ANQP messages are sent to individual responders in an overlapping manner (e.g., the GAS Init Req. message for one responder is sent before the GAS comeback delay $t_d$ for another responder expires).

Figure 2:
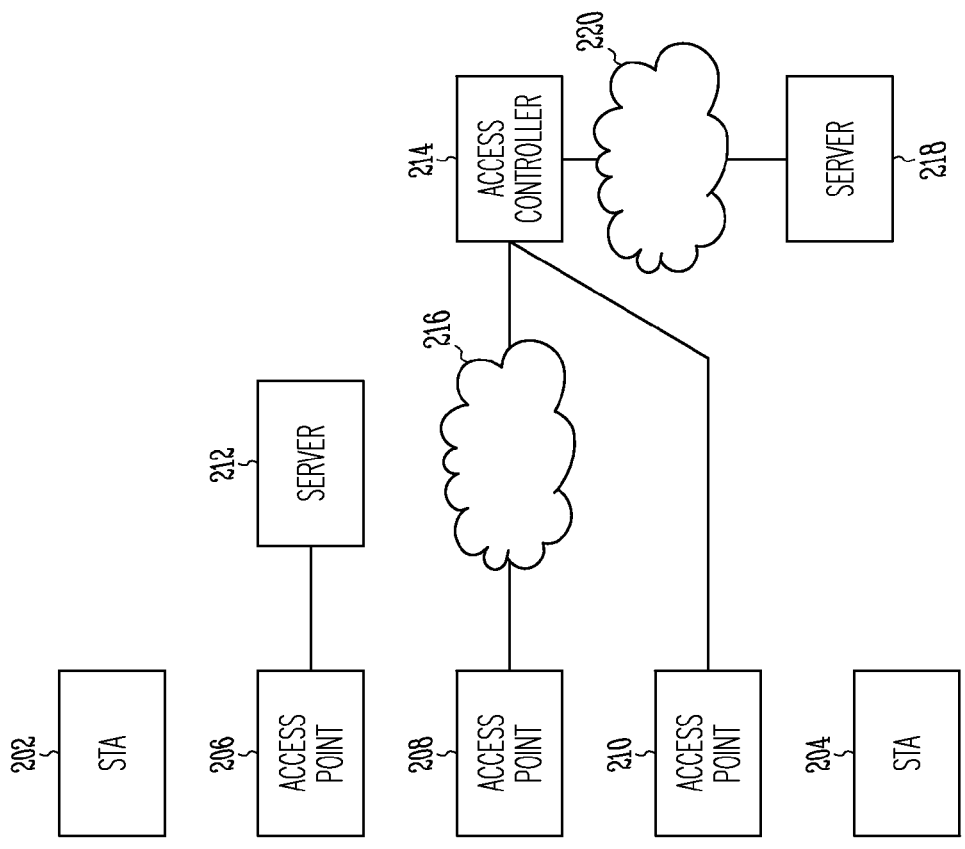
FIG. 2 illustrates a network environment, according to some embodiments.
Figure 2:
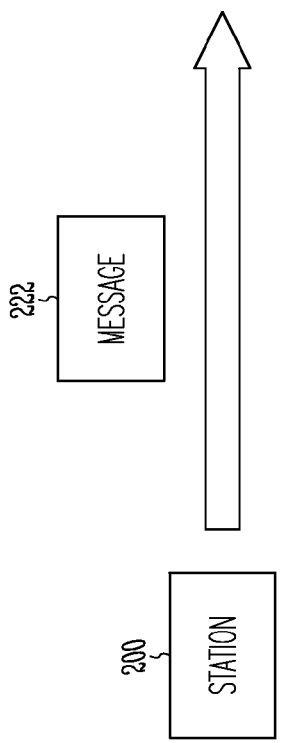

FIG. 2 illustrates a network environment, according to some embodiments. In FIG. 2, a station 200 wants to establish a link with an appropriate responder. Stations (sometimes referred to as mobile devices) can include, but are not limited to, cellular telephones, smart phones, tablets, laptops, desktops, personal computers (PCs), servers, personal digital assistants (PDAs), web appliances, set-top boxes (STBs), network routers, switches or bridges, printers or other devices, and the like. In addition, responders may include access points, stations, or other responders implementing the principles described herein. Responders in FIG. 2 include stations 202 and 204 and access points 206, 208, and 210.

Responders that are access points may be connected to an appropriate server or other device directly, through a network, or even through an access controller. In FIG. 2, access point 206 is connected to server 212. Although a direct connection is shown, access point 206 may also be connected to server 212 through a network. Also in FIG. 2, access point 208 is connected to access controller 214 through network 216. Access controller 214 is connected, in turn, to server 218 through network 220. Access controller 214 may also be connected directly to server 218.

A message, such as message 222, may be sent using broadcast or multicast so that it is received by all responders (e.g., stations 202, 204 and access points 206, 208 and 210) within range.

Figure 3:
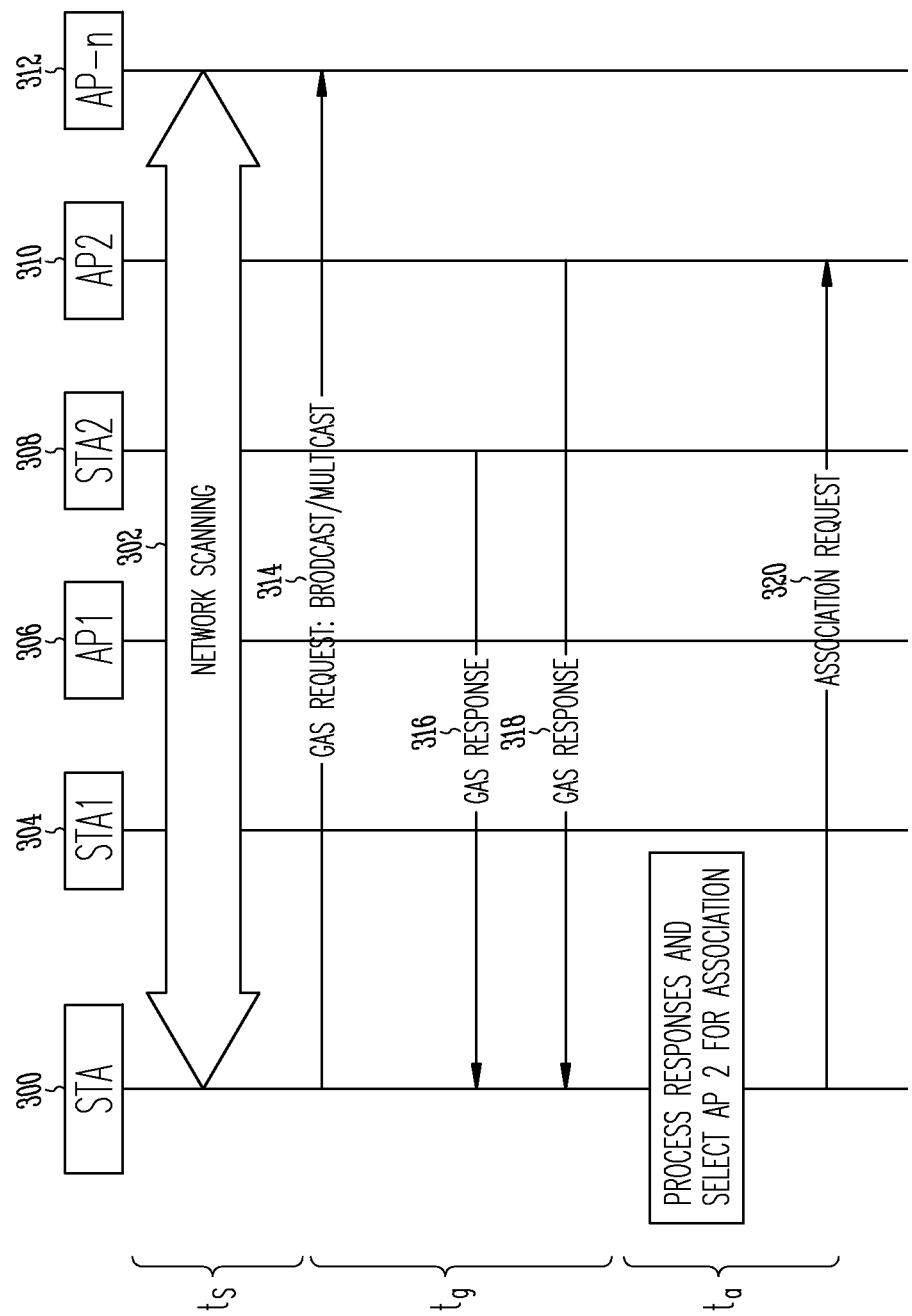
FIG. 3 illustrates initial link establishment, according to some embodiments.

FIG. 3 illustrates initial link establishment, according to some embodiments. In FIG. 3, station 300 performs a scanning process, illustrated by 302, to identify responders. These responders can be AP, STA, or other responders. The scanning process can be any process that allows station 300 to identify responders, such as a passive scan process or active scan process. For example, the scan process can be that illustrated in FIG. 1 (e.g. scan request 106, scan response 108) or any other scanning process. In FIG. 3, the scanning process identifies responders 304, 306, 308, 310, and 312 (e.g. STA1, AP1, STA2, AP2 and AP-n, respectively).

Once all responders have been identified, station 300 transmits GAS Request message 314 having a broadcast or multicast delivery method so that all responders receive the message and access the information contained therein. The GAS Request message 314 contains information regarding a service that station 300 is interested in obtaining. For example, GAS Request message 314 may contain indicating that station 300 wants to access its home network provider realm "GreenWiFiProvider.com" or needs a network that is providing Virtual Private Network (VPN) services.

As responders receive GAS Request message 314, they determine if they are able to provide the service requested. In one embodiment, only responders able to provide the requested service respond. In other embodiments, any responders may respond to the request. In FIG. 3, responder 308 and responder 310 are able to provide the requested service and so respond with GAS Response message 316 and GAS Response message 318, respectively.

Although not illustrated in FIG. 3, GAS Request message 314 may also contain ANQP information that causes a responder to further initiate communication with an ANQP server. The GAS Response message may also contain a comeback delay value that causes station 300 to further initiate GAS comeback request/response exchanges with a responder.

After station 300 receives all needed information, station 300 will process the responses and select a responder for association. In FIG. 3, station 300 selects responder 310 and transmits an Association Request (AQ) message 320 to responder 310.

As illustrated in FIG. 3, the procedure can result in significant time and energy savings for station 300 to establish an initial link with a responder. Rather than initiating individual GAS Request/Response exchanges with all available responders one by one, the broadcast GAS Request message allows all responders to consider the information at once. Then, if only the responders that can provide the requested service respond, station 300 need not waste time communicating with and processing information from responders unable to provide the requested service. This also reduces the time needed to process the responses and select an appropriate responder.

FIG. 4 illustrates a GAS Request message 400 (sometimes referred to as a frame), according to some embodiments. The various fields 402 (or Orders) of the GAS Request message 400 are illustrated. Field 404 is a Category field (e.g., Public Action Frame), field 406 is an Action field (e.g., GAS initial request Frame), field 408 is a delivery method field (e.g., with a value indicating unicast, multicast or broadcast), field 410 is a dialog token, field 412 is an advertisement protocol element, field 414 is the query request length, and field 416 is the query request.

Fields 404, 406, 410, 412, 414, and 416 can correspond to Orders 0-5, respectively, in the GAS Initial Request frame as defined by IEEE Std. 802.11u-2011, which is an amendment to IEEE Std. 802.11-2007 as amended by IEEE Std. 802.11k-2008, IEEE Std. 802.11r-2008, IEEE Std. 802.11y-2008, IEEE Std. 802.11w-2009, IEEE Std. 802.11n-2009, IEEE Std. 802.11p-2010, IEEE Std. 802.11z-2010 and IEEE Std. 802.11v-2011, all of which are incorporated by reference. In these specifications GAS Initial Request Frame is defined in 7.4.7.13 (GAS Initial Request frame format) and Table 7-57f6 as: the category field (order 0) is set to a value indicating a public action frame, as specified in Table 7-24; the action field (order 1) is set to the value specified in table 7-57e for a GAS Initial Request frame; the dialog token (order 2) is defined in 7.3.1.12 and is set by the requesting station; the advertisement protocol element (order 3) is defined in 7.3.2.93 and includes exactly one Advertisement Protocol ID; the query request length (order 4) is defined in FIG. 7-101h10 and is set to the total number of octets in the query request field; and the query request field (order 5) is defined in FIG. 7-101h11 and is a generic container whose value is a GAS Query that is formatted in accordance with the protocol specified in the Advertisement Protocol element.

Figure 5:
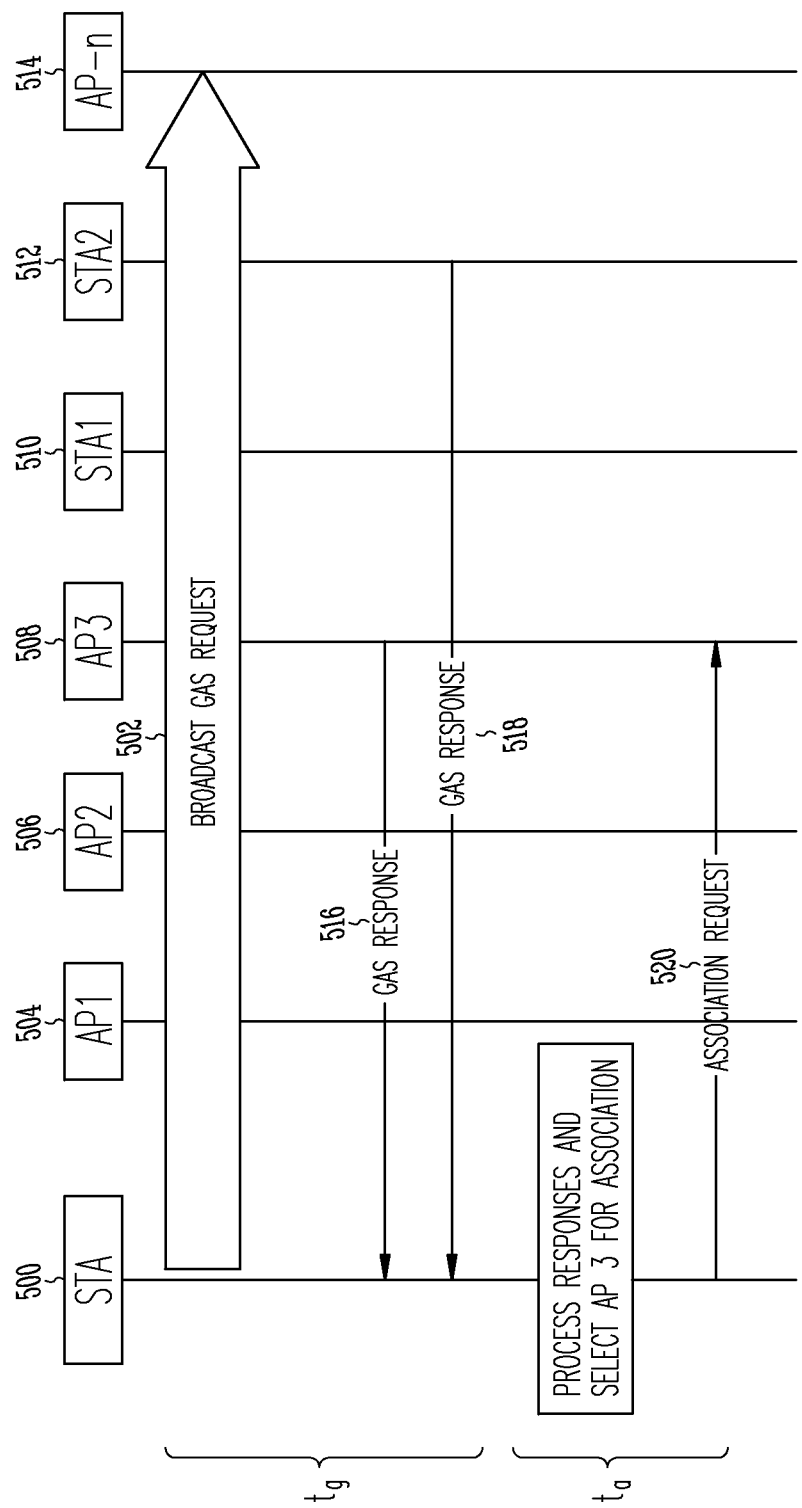
FIG. 5 illustrates initial link establishment, according to some embodiments.

FIG. 5 illustrates initial link establishment, according to some embodiments. In FIG. 5, no separate network scanning is performed. Rather, the embodiments rely on the broadcast GAS Request message to perform simultaneous network scanning and GAS Queries. As illustrated, station 500 broadcasts GAS Request message 502 to all responders, which can be access points, stations, or other responders (illustrated as responders 504, 506, 508, 510, 512 and 514). GAS Request message 502 can be a message such as that illustrated in FIG. 4 with the delivery mode set to broadcast. GAS Request message 502 can contain a request for a desired service. By way of example, and not limitation, such a requested service could be a network providing VPN access or a network able to access station 500's home network provider realm. As discussed in conjunction with the embodiments of FIG. 3, upon receipt of GAS Request message 502, only those responders able to provide the requested service may respond to GAS Request message 502. This is illustrated by GAS Response (GASR) message 516 and GASR message 518, which are transmitted by responder 508 and 512, respectively.

Once station 500 receives all GASR messages, it selects a responder and transmits an AQ message, such as AQ message 520 transmitted to responder 508.

Although not illustrated in FIG. 5, GAS Request message 502 may also contain ANQP information that causes a responder to further initiate communication with an ANQP server. The GAS Response message may also contain a comeback delay value that causes station 500 to further initiate GAS comeback request/response exchanges with a responder.

Figure 6:
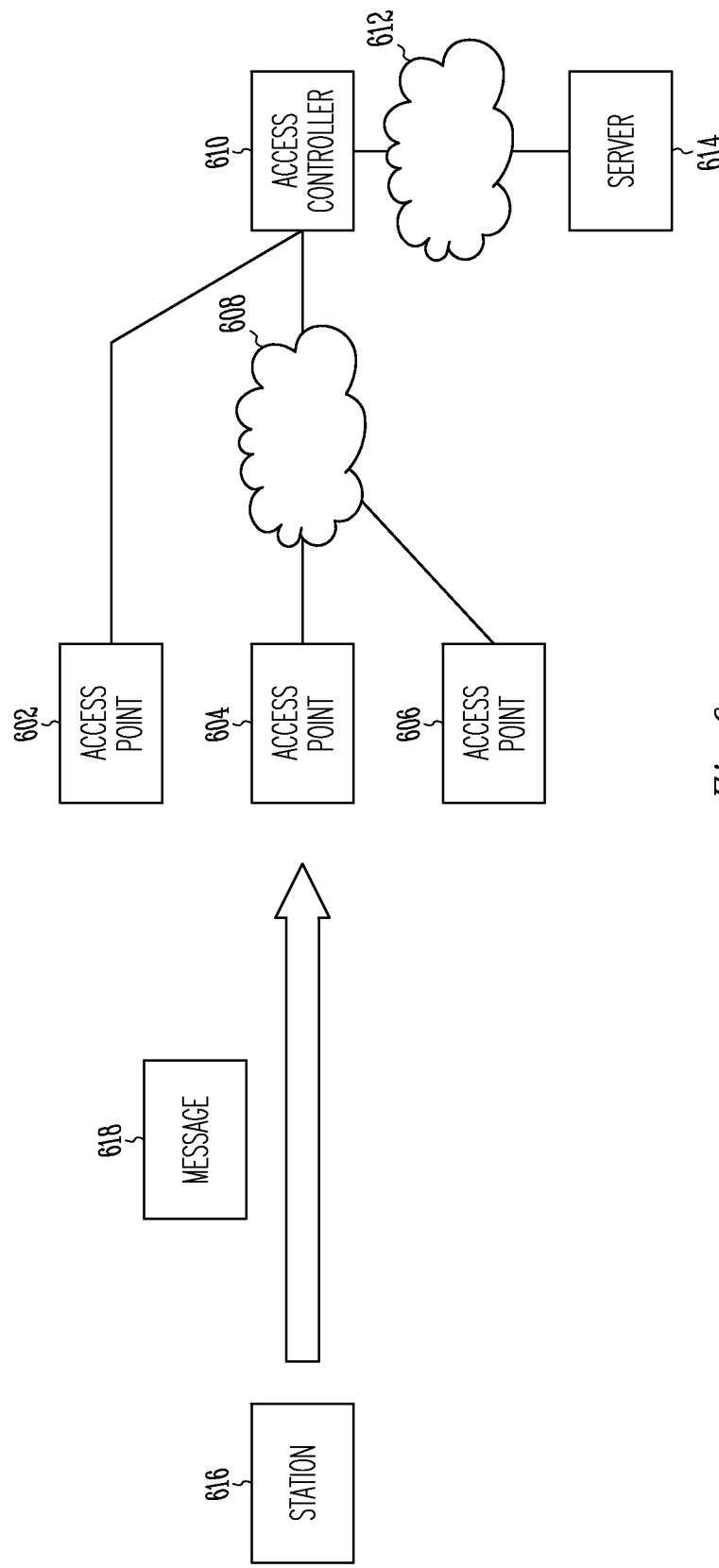
FIG. 6 illustrates filtering received GAS messages, according to some embodiments.

In some instances, multiple responders (e.g., access points) can feed received information through an access controller to a server. In these instances, when a broadcast message is received by multiple responders, multiple copies of the same message can be received at the server. FIG. 6 illustrates filtering received GAS messages, according to some embodiments. In FIG. 6, multiple responders, such as access points 602, 604 and 606, are connected either directly or through a network (e.g., 608) to access controller 610. Access controller 610 may be connected directly (not shown) or through a network (e.g., 612) to server 614.

In FIG. 6, when station 616 sends message 618 with a delivery method of multicast or broadcast and multiple responders receive the message (e.g. access point 602, 604, and/or 606), access controller 610 and server 614 can receive multiple copies of the same message and/or information. In accordance with some embodiments, duplicate copies of the message can be filtered before reaching server 614 in order to reduce the need to handle multiple copies of the same message.

In FIG. 6, when multiple copies of the same message are received, access controller 610 can filter the messages before passing the information along to server 614. This results in only a single copy of the message needing to be processed and responded to by server 614. Similarly, only a single responder need respond to station 616 so that station 616 need only process a single copy of the response. Again, this can be coordinated by access controller 610.

Figure 7:
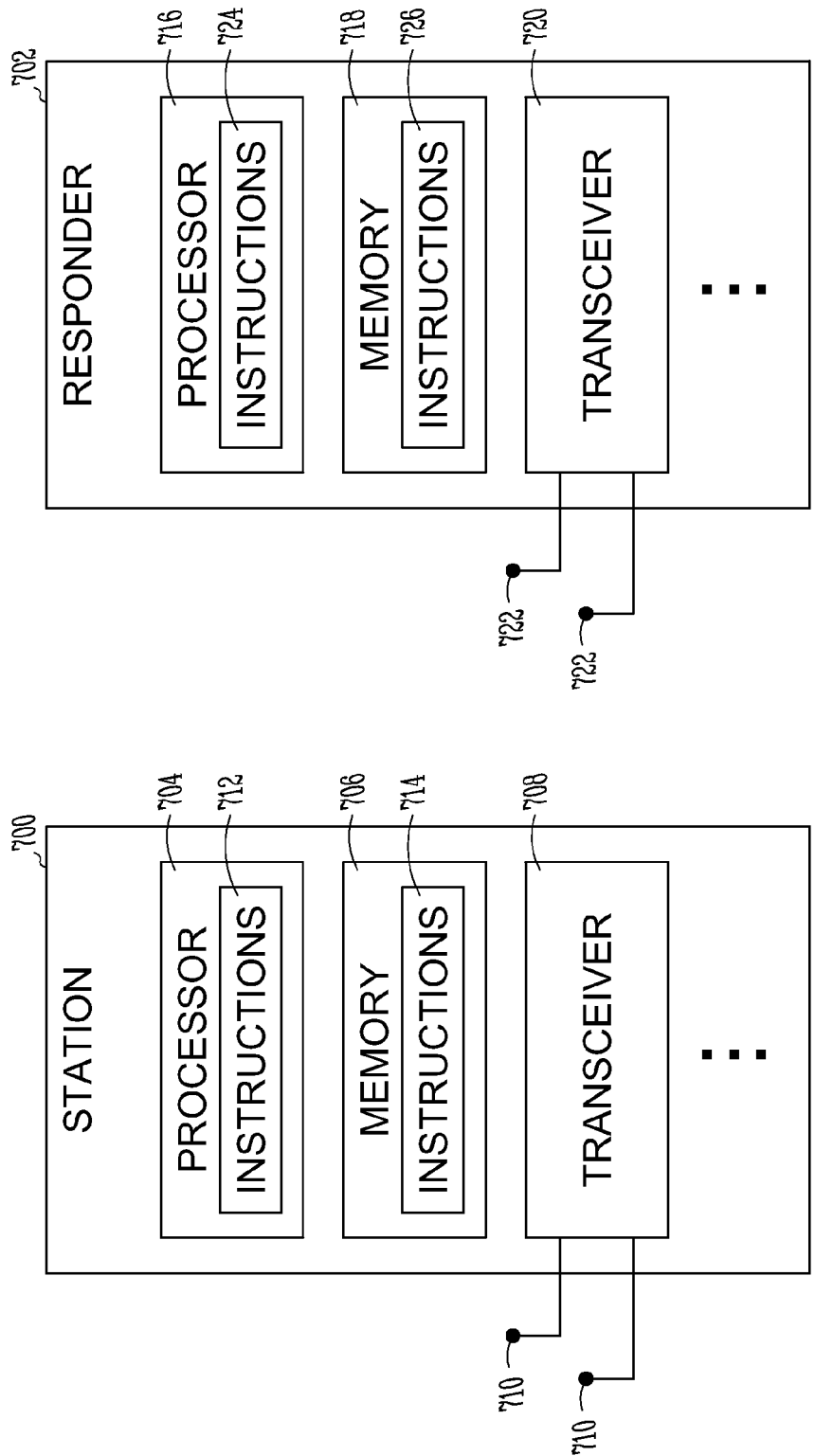
FIG. 7 illustrates a system block diagram, according to some embodiments.

FIG. 7 illustrates an example system block diagram, according to some embodiments. FIG. 7 illustrates a block diagram of a station 700 (such as station 102, 200, 300, 500, or 616) and a block diagram of a responder 702 (such as responder 104, 202, 204, 206, 208, 210, 304, 306, 308, 310, 312, 504, 506, 508, 510, 512, 514, 602, 604, or 606). Responder 702 can be an access point or other entity (including another station) that can provide network access/coverage for station 700.

Station 700 may include processor 704, memory 706, transceiver 708 (including at least one antenna 710), instructions 712, 714, and possibly other components (not shown). Responder 702 may include processor 716, memory 718, transceiver 720 (including at least one antenna 722), instructions 724, 726, and possibly other components (not shown). While similar from a block diagram standpoint, it will be apparent to those of skill in the art that the configuration and details of the operation of station 700 and responder 702 may be similar, or substantially different, depending on the exact device and role.

The processor 704 and processor 716 each comprise one or more central processing units (CPUs), graphics processing units (GPUs), accelerated processing units (APUs), or various combinations thereof. The processor 704 provides processing and control functionalities for station 700, and processor 716 provides processing and control functionalities for responder 702.

Memory 706 and memory 718 each comprise one or more transient and/or static memory units configured to store instructions and data for station 700 and responder 702, respectively. Transceiver 708 and transceiver 720 each comprise one or more transceivers including, for an appropriate station or responder, a multiple-input and multiple-output (MIMO) antenna to support MIMO communications. For station 700, transceiver 708 receives transmissions and transmits transmissions, among other things, from and to responder 702 respectively. For responder 702, the transceiver 720 receives transmissions from and transmits data back to station 700 (and perhaps other entities as well).

The instructions 712, 714, comprise one or more sets of instructions or software executed on a computing device (or machine) to cause such computing device (or machine) to perform any of the methodologies discussed herein. The instructions 712, 714, (also referred to as computer- or machine-executable instructions) may reside, completely or at least partially, within processor 704 and/or the memory 706 during execution thereof by station 700. While instructions 712 and 714 are illustrated as separate, they can be part of the same whole. The processor 704 and memory 706 also comprise machine-readable media.

The instructions 724, 726 comprise one or more sets of instructions or software executed on a computing device (or machine) to cause such computing device (or machine) to perform any of the methodologies discussed herein. The instructions 724, 726 (also referred to as computer- or machine-executable instructions) may reside, completely or at least partially, within processor 716 and/or the memory 718 during execution thereof by responder 702. While instructions 724 and 726 are illustrated as separate, they can be part of the same whole. The processor 716 and memory 718 also comprise machine-readable media.

In FIG. 7, processing and control functionalities are illustrated as being provided by processor 704, 716 along with associated instructions 712, 714, 724, 726. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The terms "computer readable medium," "machine-readable medium," and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The terms "computer readable medium" and "machine-readable medium" shall accordingly be taken to include "computer storage medium," "machine storage medium," and the like (e.g., tangible sources including, solid-state memories, optical and magnetic media, or other tangible devices and carriers but excluding signals per se, carrier waves and other intangible sources) as well as "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors, or domains may be used without detracting from embodiments disclosed herein. For example, functionality illustrated as performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

What is claimed is:

1. A wireless device comprising:
a transceiver circuitry to transmit a Generic Advertisement Service (GAS) Request message and an Association Request (AQ) message and to receive at least one GAS Response message;
processing circuitry to cause the transceiver circuitry to:
  initiate a network scan process, the network scan process to identify responders available to the wireless device;
  locate a stored profile for an identified responder;
  create the GAS Request message with a Delivery Method (DM) field value of unicast for the identified responder;
  transmit the GAS Request message;
  process the at least one GAS Response message; and
  create the AQ message and transmit the AQ message.

2. The wireless device of claim 1, wherein the processing circuitry cause the transceiver circuitry to create the GAS Request message with the DM field value selected based on the stored profile of an intended recipient of the GAS Request message.

3. The wireless device of claim 1, wherein the GAS Request message contains a request for a service and the at least one GAS Response message is received from at least one responder able to provide the service.

4. The wireless device of claim 1, wherein the DM field value is either broadcast or multicast and wherein the at least one GAS Response message is received only from responders able to provide a service requested in the GAS Request message.

5. A wireless device comprising:
transceiver circuitry;
processing circuitry to cause the transceiver circuitry to:
  build a scan list of available responders;
  locate a stored profile for an identified responder;
  transmit a Generic Advertisement Service (GAS) Request message unicast to the identified responder, the GAS Request message containing a request for at least one service;
  receive a GAS Response message from the identified responder;
  and
  transmit an Association Request (AQ) message to the selected responder.

6. The device of claim 5, wherein the processing circuitry causes the transceiver circuitry to build the scan list of available responders using either an active scan protocol or a passive scan protocol.

7. A method for establishing an initial connection to a wireless network comprising:
transmitting, by a station, a Generic Advertisement Service (GAS) Request message comprising a Delivery Method (DM) field indicating the GAS Request message is a broadcast or multicast or unicast message and wherein the DM field value is selected based on whether the station is associated or unassociated with a wireless network adapted to provide a desired service, the GAS Request message comprising a request for the desired service;
receiving, by the station, at least one GAS Response message, each GAS Response message transmitted by a responder able to provide the desired service; and
transmitting, by the station, an Association Request (AR) message to a selected responder.

8. The method of claim 7, wherein the request for the desired service comprises a request for access to a network provider.

9. The method of claim 7, further comprising:
scanning, by the station, for wireless networks to identify responders.

10. The method of claim 7, wherein the at least one GAS Response message is unicast from the responder to the station.

11. A method for establishing an initial connection to a wireless network comprising:
Receiving multiple copies of a Generic Advertisement Service (GAS) Request message comprising a Delivery Method (DM) field indicating the GAS Request message is a broadcast or multicast or unicast message, the GAS Request message comprising a request for a desired service;
filtering out duplicate copies so that only a single copy of the GAS Request remains;
transmitting, by a responder, a GAS Response message when the responder is able to provide the desired service; and
receiving, by the responder, an Association Request (AR) message.

12. The method of claim 11, wherein the request for at least one service comprises a request for access to a network provider.

13. The method of claim 11, further comprising
receiving, by the responder, a Scan Request (SR) message; and
transmitting, by the responder, a SR Response message.

* * * * *